United States Patent [19]

Lenihan et al.

[11] Patent Number: 5,434,981
[45] Date of Patent: Jul. 18, 1995

[54] FUNCTIONALLY PROGRAMMABLE PCM DATA ANALYZER AND TRANSMITTER FOR USE IN TELECOMMUNICATION EQUIPMENT

[75] Inventors: John P. Lenihan, Wheaton; Anthony J. Dezonno, Downers Grove, both of Ill.

[73] Assignee: Rockwell International Corporation, El Segundo, Calif.

[21] Appl. No.: 47,884

[22] Filed: Apr. 15, 1993

Related U.S. Application Data

[63] Continuation of Ser. No. 414,985, Sep. 28, 1989, abandoned.

[51] Int. Cl.6 .......................................... G06F 13/38
[52] U.S. Cl. ................................... 395/275; 395/325; 395/700; 364/942.03; 364/942.06; 364/942.07; 364/927.93; 364/975.4; 364/DIG. 2; 370/85.1
[58] Field of Search .............. 364/DIG. 1, DIG. 2; 395/200, 325, 650, 725, 275; 370/62, 84, 85.1

[56] References Cited

U.S. PATENT DOCUMENTS

| | | | |
|---|---|---|---|
| 4,430,710 | 2/1984 | Catiller et al. | 364/200 |
| 4,530,093 | 7/1985 | Akram et al. | 370/85 |
| 4,748,617 | 5/1988 | Drewlo | 370/85 |
| 4,750,168 | 6/1988 | Trevitt | 370/85 |
| 4,759,017 | 7/1988 | Allan et al. | 370/84 |
| 4,761,737 | 8/1988 | Duvall et al. | 364/300 |
| 4,815,030 | 3/1989 | Cross et al. | 364/900 |
| 4,833,638 | 5/1989 | Vollaro | 364/900 |
| 4,855,996 | 8/1989 | Douskalis | 370/84 |
| 4,862,452 | 8/1989 | Milton et al. | 370/62 |
| 4,910,658 | 3/1990 | Dudash et al. | 364/138 |
| 4,956,771 | 9/1990 | Neustaedter | 364/200 |
| 4,979,171 | 12/1990 | Ashley | 370/110.2 |

Primary Examiner—Thomas G. Black
Assistant Examiner—Maria N. Von Buhr
Attorney, Agent, or Firm—C. B. Patti; H. F. Hamann

[57] ABSTRACT

A digital signal processing system for interfacing with a central control having at least a control port. The system has a control processor having an interface port connected to the control port of the central control. The control processor also has at least first, second and third ports. At least first, second and third kernel processors for running software application tasks have first, second and third ports connected to the first, second and third ports of the control processor, respectively, each of the kernel processors having a plurality of channel ports connected to a bus for providing a plurality of channels. The control processor in response to data received from the central control establishes one of a plurality of software application tasks in each of the kernel processors.

12 Claims, 3 Drawing Sheets

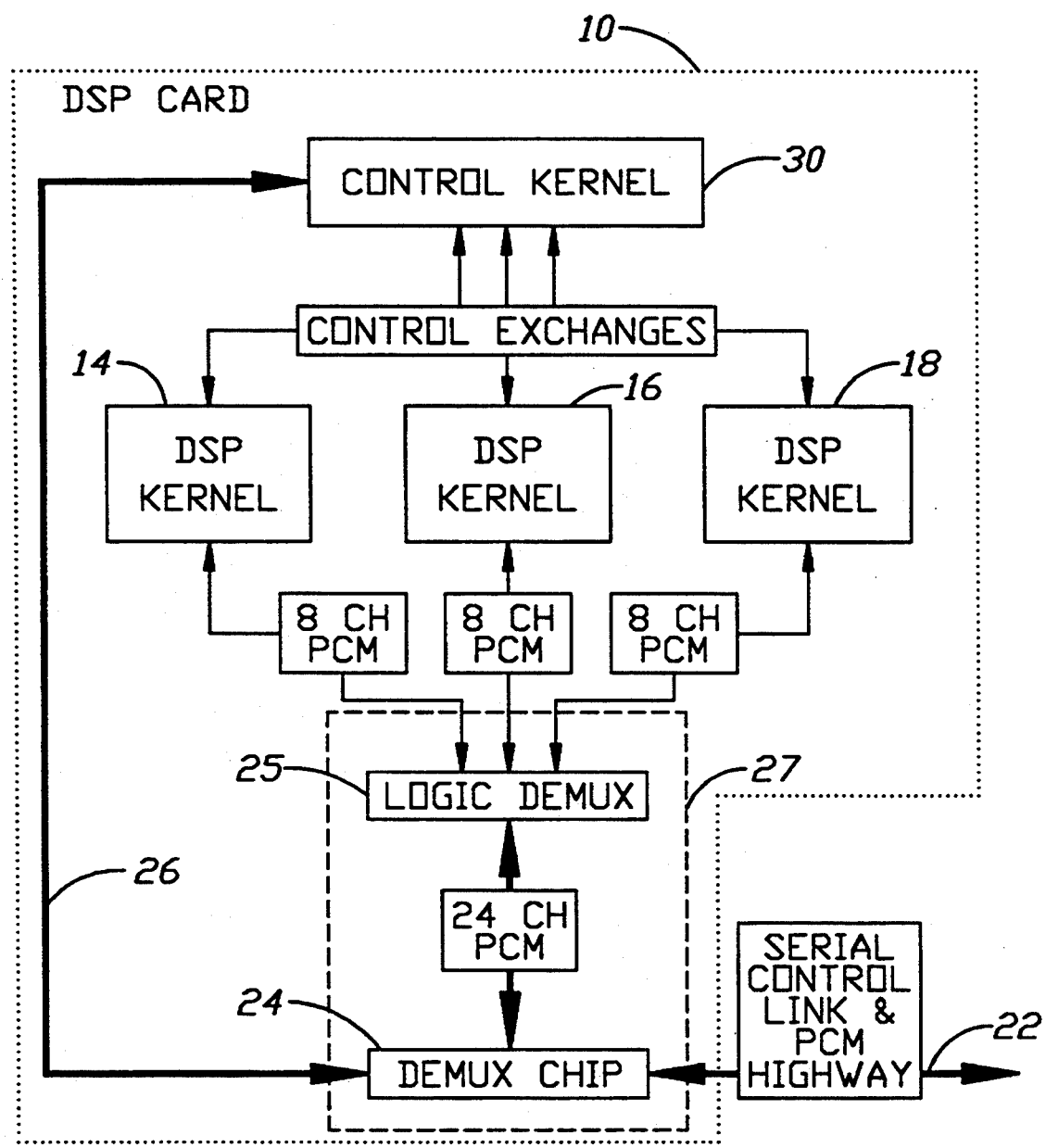

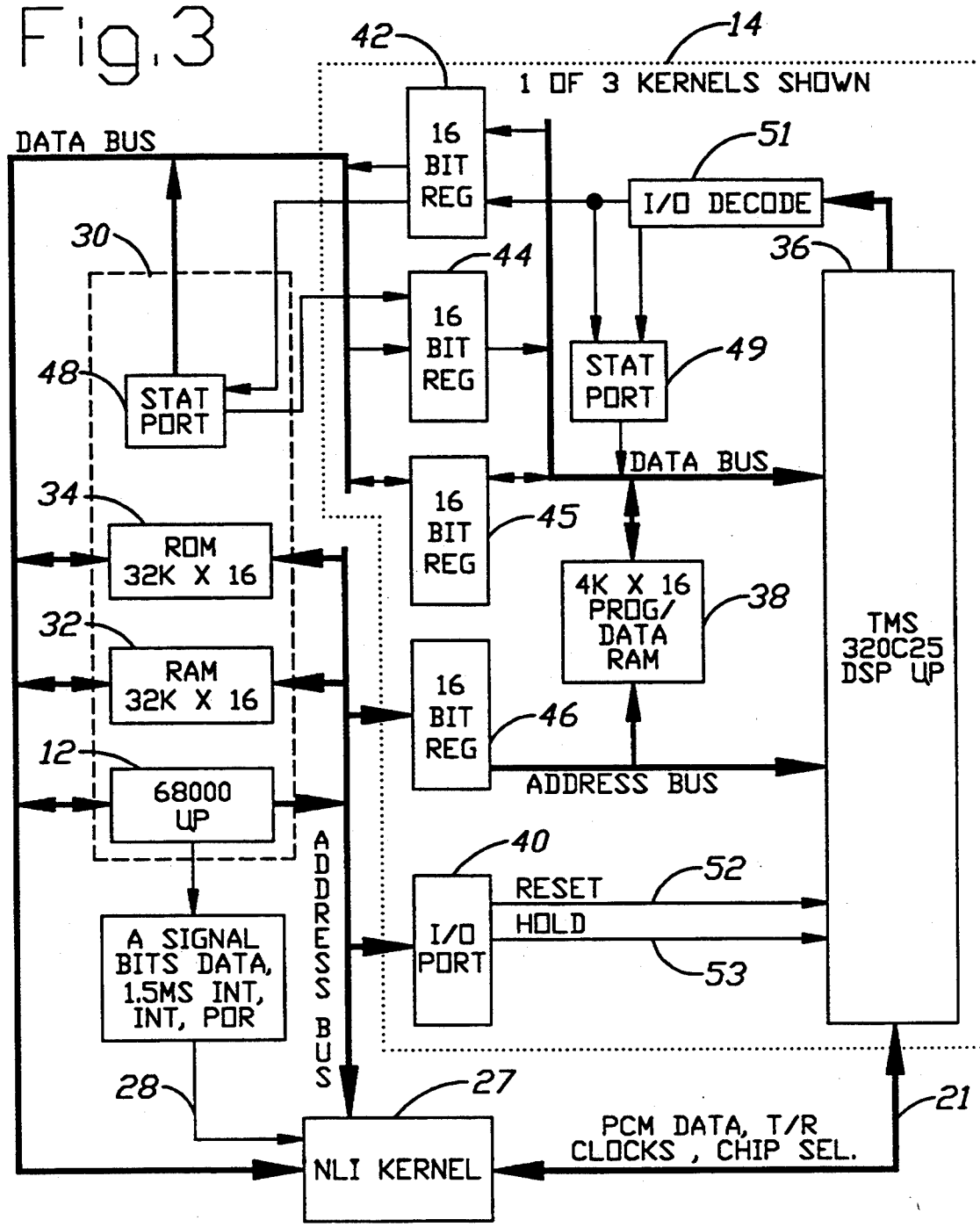

FUNCTIONALLY PROGRAMMABLE PCM DATA ANALYZER AND TRANSMITTER FOR USE IN TELECOMMUNICATION EQUIPMENT

This application is a continuation of application Ser. No. 07/414,985, filed Sep. 28, 1989, now abandoned.

BACKGROUND OF THE INVENTION

The present invention relates in general to a functional programmable PCM (pulse code modulation) data analyzer and transmitter for use in telecommunications equipment.

In general PCM data analyzers look at signal characteristics such as voltage, power, frequency, DTMF detection and a variety of other characteristics of information in the digital telecommunication system. These devices usually connect externally to the telecommunications equipment. Such external equipment requires analog conversion and the circuitry of such equipment often requires programming to perform specific functions when installed in a switch of a telecommunications system.

The present invention overcomes these drawbacks of the prior art and provides a data analyzer and transmitter which is integrated in the telecommunications equipment and further which is programmable so that it may address different functions at different times.

SUMMARY OF THE INVENTION

It is an object of the present invention to provide a digital signal processing system for interfacing with a means for central control having at least a control port. The present invention has a control means for processing having an interface port connected to the control port of the central control. The means for processing also has at least first, second and third ports. At least first, second and third kernel means for running software application tasks have first, second and third ports, respectively, connected to the first, second and third ports of the control means for processing, respectively. Each of the kernel means has a plurality of channel ports connected to a bus means for providing a plurality of channels. The control means for processing in response to data received from the central control establishes one of a plurality of software application tasks in each of the kernel means. The bus means carries at least 24 channels, each of the kernel means communicating with 8 channels of said 24 channels such that each kernel means receives different channels then channels received by other kernel means. The 24 channels are pulse code modulated and designated 0 through 23, the first kernel means communicating with channels 0, 1, 6, 7, 12, 13, 18 and 19, the second kernel means communicating with channels 2, 3, 8, 9, 14, 15, 20 and 21 and the third kernel means communicating with channels 22, 23, 4, 5, 10, 11, 16 and 17. Each of the kernel means have their respective channel ports connected to the bus means by a means for multiplexing/demultiplexing such that each of the kernel means communicates with its respective channels of the 24 channels.

Each of the kernel means has a means for processing and the software application tasks include at least one of DTMF (dual tone multifrequency) detection, MF (multifrequency) detection and metering. Each of the kernel means is separately assigned any one of the application tasks by the control means for processing.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 2 is a more detailed block diagram of the present invention;

FIG. 3 is a further more detailed block diagram of the control portion and of one of the DSP kernels;

DESCRIPTION OF THE PREFERRED EMBODIMENT

Figure 1:
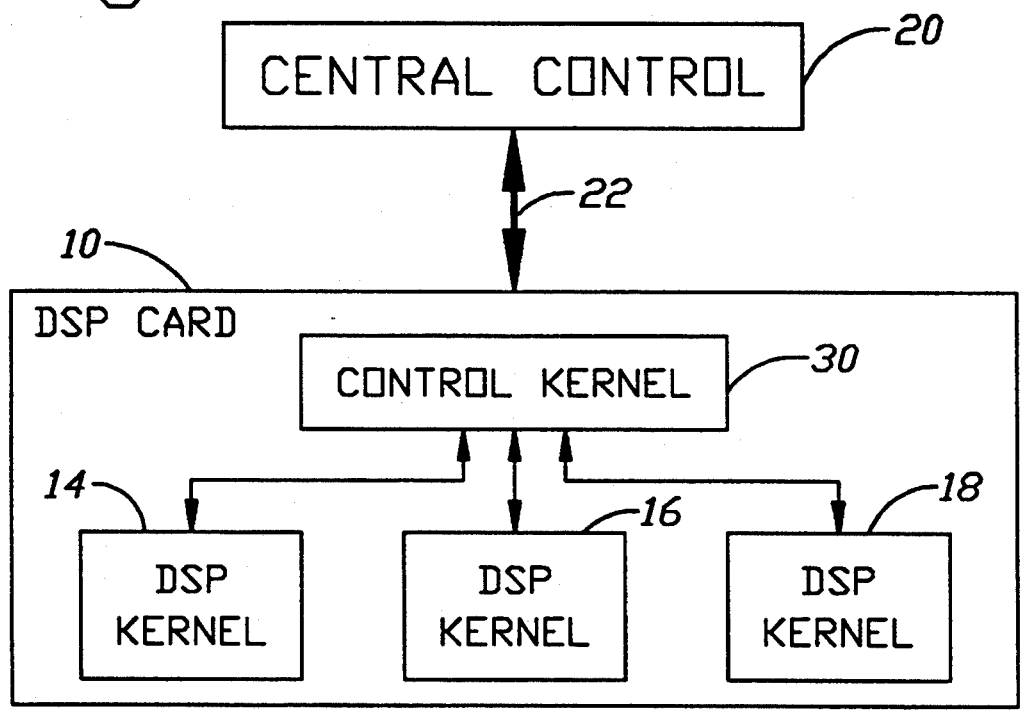
FIG. 1 is a general block diagram of the present invention in the environment of a telecommunications system.

The present invention has general applicability, but is most advantageously utilized in digital signal processing embodied on a Digital Signal Processing (DSP) Card, as shown in FIG. 1. In a preferred embodiment, the Digital Signal Processing Card 10 provides DTMF and MF detection, and other functions. A typical automatic call distribution (ACD) application will consist of one DSP card with another one as a backup. The Digital Signal Processing backup card can be used as a digital multimeter for system connection to various lines for testing purposes, while a card such as a Digital Audio Source (DAS) backup card can be used for message recording and editing.

For clarity, the Network control structure that is outside of the DSP card is referred to herein as a Central Control 20. The control kernel 30 that is on the card is a 68000 microprocessor 12, and the three application microprocessors 14, 16, 18 on the card are referred to as DSP kernels.

Each of the three DSP kernels 14, 16, 18 on the DSP card 10 can be configured for one of several functions. Three of these functions, MF detection, DTMF detection, and metering are included in the preferred embodiment of the present invention, and a path is provided for adding new features to this same hardware by later software additions.

The DSP card 10 can support any combination of 3 software applications per card. For example, the Digital Signal Processing Card 10 can be assigned by Central Control 20 to be either three applications of DTMF detection, three applications of MF detection, or a mixture of three different applications. The term application will refer to the code running in each DSP kernel. Each application will service more than one channel. After the Central Control 20 downloads software to the DSP kernels 14, 16, 18 each kernel continuously monitors each hardware assigned channel. Upon completion of the application task, the DSP kernels report their results to the 68000 microprocessor 12. The 68000 microprocessor 12 may then respond to the Central Control 20.

In the ACD environment, where only a small number of DTMF detection channels are required, a typical configuration would be one DTMF, one MF, and one meter application on a single card. There would be only one card in the system with one backup card.

In a tandem switch environment where a large number of channels of both DTMF and MF are required, each card might be configured with three applications of either DTMF or MF, and a dozen or so cards would reside in a system. Again, one card could be a backup.

The Central Control 20 referred to herein is any part of the control structure which resides outside of the DSP card 10 (see FIG. 1). The card represents a three section programmable resource of the Central Control. There is a control microprocessor 12 (MC68000) on the DSP card 10 which controls the entire card including handling mail information to the Central Control 20, access to a serial control link (not shown), control of the three DSP kernels 14, 16, 18 and collection of dial pulse information.

Each DSP kernel 14, 16, and 18 comprises a microprocessor 36, memory 38, an interface to the 68000 microprocessor, and an interface with a PCM highway. Each of the three DSP kernels can be downloaded with one of several applications. The three applications can be, for example: DTMF detection for 8 channels; MF detection for 8 channels; and digital multimeter function for 8 channels.

The DSP card 10 shown schematically in FIG. 2, the card will appear to a Central Control System as the number proportional to channels of the number of applications that have been downloaded. When, for instance, a DTMF register is required at the Central Control level, the list of available registers will be checked, and one will be assigned. This command is received by the 68000 microprocessor 12, which issues a command to the appropriate DSP micro that is one of the three DSP kernels 14, 16, 18, on the card. The DSP micro then assigns a detector and upon reception of a valid digit, returns the digit code to the 68000 microprocessor 12. The microprocessor 12 has the option of collecting digits before reporting them to the Central Control 20. If after a certain time out when no valid digits are received by the DSP micro, the 68000 microprocessor 12 may notify the Central Control 20. The DSP micro assigned by the 68000 microprocessor 12 may then be either deallocated or allowed to continue longer.

FIG. 2 illustrates communications with the DSP card 10 over the multiplexed Serial Highway 22. The 24 channel PCM data as well as the Control Link information pass over the link 26. A custom multiplexing and demultiplexing network line interface integrated circuit 24 (NLI IC) performs these operations. The 24 channels of PCM data are then further demultiplexed by logic demultiplexer 25 to connect to the three DSP kernels 14, 16, 18.

Before going into the functional description, a few terms will be defined. The term firmware applies both to the program code in the DSP kernels 14, 16, 18 and for the 68000 microprocessor 12 which interfaces to hardware elements (the I/O interface). This code is rudimentary in nature and all application programs (such as DTMF, MF, or others) will interface with this code in a similar fashion. Thus 2 types of firmware exist; C25 firmware and 68000 firmware.

The term software, on the other hand, signifies an application program which, excluding any ties with I/O, is independent of the hardware arrangement. Thus, software is the actual application task which will be run by the microprocessor on the card.

The software that resides on the DSP card for the 68000 microprocessor is responsible for several control items. The 68000 microprocessor must handle communications with the Central Control 20 through the NLI IC 24 receive and transmit buffers.

The 68000 microprocessor also performs the functions associated with collecting digit strings. Moreover, it must accept A signalling from the NLI 24 over Serial Control Link 28 and can calculate the correct dial pulse sequence. During initialization, it must download its own program and the program for each DSP kernel.

It must also perform self diagnostics and be able to identify a faulty DSP kernel and take appropriate action such as resetting the DSP kernel. Each DSP kernel contains a general purpose high speed digital signal processor which can perform real time operations on digital data being received over the PCM highway from the NLI. Thus, the kernel processor can run numerous types of application tasks for the system.

Figure 4:
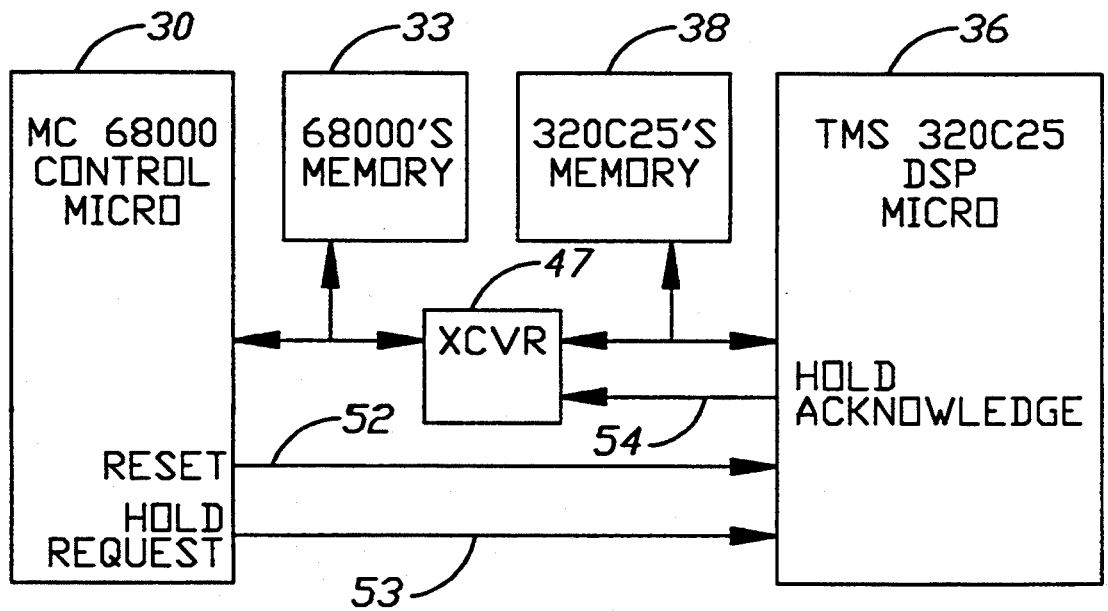
FIG. 4 is a block diagram schematically illustrating the interface between the control kernel and one of the DSP kernels.

The DSP kernel will also run self diagnostics to validate both hardware and software integrity. The 68000 microprocessor will periodically order the DSP kernel to perform program RAM contents validation, and expect the kernel processor to respond accordingly with its findings. As shown in FIGS. 3 and 4, the 68000 microprocessor communicates with the C25s through the XCVR block 47 consisting of registers 42, 44, 45 and 46.

The 68000 microprocessor 12 will monitor status port 48 to communicate with the DSP kernels. When a kernel processor writes data to the 16 bit register 42 for the 68000 microprocessor 12, a bit in the status port 48 will activate. The 68000 microprocessor 12 upon sensing this activity will respond by reading the register to collect the new information. The read operation will then reset the bit and signal to the kernel processor that new data can be written into the register.

When new data to the Central Control 20 arrives from the DSP card 10, the NLI 24 will activate an interrupt to the 68000 microprocessor 12. The 68000 microprocessor 12 responds by reading the NLI receive FIFO while in the interrupt routine.

The kernel processor firmware is the program code which resides at the DSP kernel that defines the hardware environment of the TMS320C25 processors. After the software is downloaded to the DSP kernel, the firmware will read and write from the PCM data stream, receive instructions from the 68000 microprocessor, and return results to the 68000 microprocessor.

The kernel processor will monitor an input buffer to communicate with the 68000 microprocessor. When the 68000 microprocessor writes data to the 16 bit register 44 of the kernel processor, a bit in the input buffer (status port 49) will activate.

The kernel processor upon polling this buffer for activity should respond by reading the register 44 to collect the new information. The read operation will then reset the bit and signal the 68000 microprocessor that new data can be written into the register 44.

An input pin of the kernel processor is used to detect an 8 KHz framing pulse from the NLI 24. This signal, when active, indicates that a new frame of information is starting and that the software frame/channel counters should be reset to zero.

The 68000 microprocessor kernel 30 consists of a 68000 CPU, 32K×16 Ram, and 32K×16 ROM. An additional 32K words of RAM can be added to the card when memory chips and a different programmable array logic PAL chip (DSPPALOB) are added to the card. The primary information in the ROM is self boot, link communication primitives, and diagnostic tests. All the programs for the DSP kernel and the 68000 microprocessor will be downloaded through the NLI control link interface which connects to the control complex. This download capability allows maximum flexibility for software changes at a later date. There are also registers for communicating control information with the NLI 24, serial data for transmission, and the reception of PCM dial pulse data.

There are control registers to communicate with each of the DSP kernels 14, 16, 18 as well as the capability to perform real time direct memory access DMA functions to the kernel program memory bank.

Each DSP kernel 14, 16, 18 appears to the 68000 microprocessor 12 at different memory addresses. This permits the 68000 microprocessor 12 to load the program memory of each DSP kernel 14, 16, 18 separately. An output register of the 68000 microprocessor 12 controls the reset and hold mode pins of each DSP kernel 14, 16, 18 separately.

The 68000 microprocessor 12 has the capability to detect or to mask bus errors while accessing external memory or devices. If a data transfer acknowledgement from the external device accessed by the 68000 microprocessor is not received after a certain timeout period, a bus error will occur. This will force an exception processing routine to occur on the 68000 microprocessor 12. An example of this occurrence happens when the 68000 microprocessor 12 attempts to access the memory of a DSP kernel before the kernel is put into the hold state. The bus error exception processing routine will examine the contents of the stack to determine the location of the mishap.

The 68000 microprocessor 12 also interfaces with a write protect memory circuit. An 8 bit register can protect blocks of 4K words of the 68000 microprocessor 12×32K word RAM memory. An additional 8 lines are available for the protection of an additional 32K words of memory which can be added on the card 10. Each of the three kernel processors 14, 16, 18 may interrupt the 68000 microprocessor 12.

The circuit configuration for all 3 DSP kernels are the same. This commonality prevents the occurrence of kernel specific software which would limit the type of applications executable on the card.

The DSP kernel comprises a TMS320C25 (C25) digital signal processor kernel with 4 k×16 high speed static ram, control registers that allow the passage of 16 bit information between the 68000 and the C25s, and address decoding.

The C25 separately addresses the 64K of program, data and I/O space. Program space and some data space for the processor resides in the 4K of RAM in the kernel. Some data space of the processor 36 exists internally in the processor, providing 512 words of storage capability. The processor accesses the I/O space of the 16 bit read/write registers 42 and 44 selected by the I/O decode block 51 for communicating with the 68000 microprocessor 12 while not in the hold state and a status port 49 to determine if the 68000 microprocessor 12 has new information in the message register 44.

The 68000 microprocessor 12 has the capability of forcing a hold mode on to the C25 processor. While in the hold mode, the C25 processor halts program execution, and places all address and data lines in a high impedance state. This mode also enables the 68000 microprocessor 12 to access the program memory of the C25 kernel.

The NLI kernel 27, comprising logic demux chip 25 and demux chip 24, contains the circuitry necessary for the card 10 to communicate over the system backplane to a network shelf controller (NSC). This allows the passage of control commands and data to the card to indicate the tasks the card will correspondingly perform and report. Usage of the NLI IC (demux chip) 24 and a PCM commutating circuit (logic demux chip) 25 allow the card to communicate with the rest of the system.

On both receive and transmit serial PCM operations of the C25, the commutating circuit 25 divides the PCM data into groups of 2 channels that sequentially select each C25. Thus the channels assigned to each C25 are fixed, and are in a predetermined sequence. The commutating circuitry 25 contains a counter which produces pulses to signal the C25 to begin transmission or reception of PCM serial data. The NLI demux chip 24 is an application specific integrated circuit ASIC which contains the necessary logic for communicating, through drivers and receivers, over the backplane.

The Serial Highway 22 contains multiplexed PCM data and control data to and from the card. Although the control link will contain bidirectional information, for descriptive simplicity, control information will be assumed to flow from the Central Control to the 68000 microprocessor 12, and Report or Status information flows from the 68000 microprocessor 12 to the Central Control.

The software handles all the incoming and outgoing mail for the DSP card. Mail queues are maintained for both directions to assure orderly flow away from and toward the card.

Inherent in the Digital Signal Processing card (as well as all other cards that use the NLI bus) is the ability to insert a PCM sample onto the "to switch" NLI bus and to extract the PCM sample from the "from switch" NLI bus. As a test of system integrity, digital test tones from the DAS Module could possibly be sent over the network link to the DSP Module for detection.

A register/transmitter pair will be acquired and tone digits will be sent between the two. If the digits sent match the digits received, there is a high probability that both of the pair are functioning correctly. Since these digits will be sent over the NLI buses and through a time slot interchanger TSI card, a further test can be run using the Pad/Gain feature of the TSI. This would involve adding pad and/or gain to the transmitted digits and seeing if the receiver still recognized the digit as valid. Both tests between the DAS Module and the DSP Module could be run to check system integrity.

The 68000 microprocessor kernel 30 must maintain contact with each DSP kernel and with each channel. One way of approaching this function would be to maintain a list of status tables and report tables for each DSP kernel. The 68000 microprocessor 12 would check the status of each device and take appropriate action.

The firmware is written to present a common format to the software in the 68000 microprocessor 12. A one word message can be sent between the 68000 microprocessor 12 and the C25. When the 68000 microprocessor 12 resets a DSP kernel, it will clear the message register flags invalidating any data present.

This section deals with the protocols and data transfers between the DSP card 68000 microprocessor 12 and TMS320C25 CPUs. As shown in FIG. 3, there are 2 main interfaces between the C25 and the 68000 CPUs.

First is the download interface comprising registers 45 and 46. This is only used for initial program load. The 68000 cpu resets the C25, puts the C25 CPU on hold and loads its program memory with the application program intended. The second is the status Port Interface comprising status ports 48 and 49. A status Port on each CPU is tied together and a handshaking technique is used to ensure that communication is positively transferred between the CPU's. This interface will be used to transfer information while the C25 is running.

In the preferred embodiment there are 3 separate application programs that may be downloaded from the 68000 microprocessor 12 to the C25. One is DTMF tone detection program. This detects 40 milliseconds DTMF tones and reports the events to the 68000 cpu. Another is MF tone detection. This detects any of 15 combinations of 2 tones for MF tone detection applications. Finally, there is metering. This provides an AC or DC voltmeter as well as a frequency counter for doing some analog testing in the switch. Each application program is less than 1000 words.

All of the programs listed have a sanity test capability (a check sum of the program memory) that may be run in a background mode. The main task of the C25 is to perform one of the real time functions listed above. Each program is time multiplexed providing an 8 channel capability. All 8 channels associated with a given C25 will be dedicated to performing the same task. That is to say you cannot have 4 channels of DTMF and 4 channels of metering on a single C25.

The C25 program uses almost all of its available RAM and most of the CPU time. As a result the C25 operating system is very simple. The PCM samples are stored in an elastic buffer during the real time interrupt. A background mode of operation provides for the 68000 CPU interface routines and the execution of the downloaded program.

Real time interrupts occur every 31.25 microseconds. About 2 microseconds of each interrupt are required to store the PCM samples. When interrupt routine is completed, the background tasks will be executed. The interrupt handling routines should be a minimum of 10 instruction cycles long to avoid re-execution of the interrupt routines since interrupts on the C25 are both edge and level sensitive and the interrupt pulse is 970 nanoseconds long. Thus if the interrupt handler completes its task in under 10 cycles, another interrupt process will occur.

When a background task is completed, the C25 will return to an idle loop to find a new task. The tasks will be prioritized in the following order:

1) Process PCM samples. If there is an unprocessed PCM sample in the elastic buffer, the sample will be processed according to the application that has been downloaded.
2) Service 68000 I/O requests. The I/O status register 49 will be checked for an instruction from the 68000 and put in a command queue.
3) Check sum testing. If there are no other tasks then a few words of program memory are check summed.

Initialization of the 3 C25 processors begins with the reception of the POR (Power on Reset) signal from the NLI. The POR~signal automatically causes all C25s to enter both a reset and hold state. After the 68000 microprocessor 12 fully loads software code from the control complex, it will begin loading each 4K program/data space of the C25s. Upon completing program load, the 68000 will release control of the reset 52 and hold 53 lines of the C25s, shown in FIG. 4, allowing program execution to begin at address >0000.

The beginning software code that the C25 runs will start by initializing the status registers ST0 and ST1 of the C25. The following is a list of register settings for a preferred hardware arrangement:

F0=0 Configures serial ports to 16 bits. Command: FORT 0

HM=1 C25 executes in hold mode. Command: SHM

ITM=0 Enables interrupts. Allows serial port operations. Command: EINT

IMR= >0010 Enables serial port recv int, disables NLI clock int and trx serial int (unused) Command: load data loc 0004 with >0030

FSM=1 Frame pulses required for serial port operation. Command: SFSM

TXM=0 Transmit frame pulse in an input. Command: RTXM

Another process that the C25 will complete is the loading of data space memory which is internal to the C25 with constants from the program space memory. The TBLR instruction will allow the transfer of this information into the C25 data space.

Other software commands allow the C25 to utilize I/O space for communicating with the 68000 master processor. The C25 has 2 input ports and 1 output port for accomplishing this task. Input port 0 and output port 0 are two 16 bit registers 44 and 42, respectively which allow data transfer between the 68000 and C25 while both are processing information. Input port 1 acts as a status register 49 for the C25 which controls the transfer operation of the C25 so that no information is lost.

When the C25 writes data with OUT 0 to the data register 42 for the 68K, a bit is reset with a flip flop to signal to the 68K that data is available. When the 68K reads this location, the flip flop will set indicating that more data can be sent. This bit can be read by the C25 and is INP 1, bit 1.

Likewise, when the 68K writes a word to the C25, bit 0 of input port 1 is reset. The C25 periodically polls this port to determine if information is available by testing for bit 0 being 0. The following is a sample of C25 software which performs this function:

| | | |
|---|---|---|
| IN | STAT, 1 | ; STORE TRANSFER STATUS IN DATA MEM LOCTN |
| LAC | STAT | ; PUT TRANSFER STAT IN ACCUMULATOR |
| ANDK | >0001 | ; CHECK FLAG FOR DATA FROM 68K.0=TRUE |
| BGZ | NO_MSG | |
| IN | 68K_RD,0 | ;READ I/O PORT 0 FOR MESSAGE AND STORE IT |

NO_MSG: .

PCM data transfers serially between the NLI and the C25. The C25 receives and transmits an assigned group of channels as set in hardware:

TABLE 1

| Channels Used with NLI | |
| --- | --- |
| C25A | 0, 1, 6, 7, 12, 13, 18, 19 |
| C25B | 2, 3, 8, 9, 14, 15, 20, 21 |
| C25C | 22, 23, 4, 5, 10, 11, 16, 17 |

Thus, each C25 will receive 8 channels of information. This PCM data loads as 16 bits (2 channels) into the C25, where the lower numbered channel is in the high byte of the DRR-data receive register. Once this register fills, an interrupt will occur, and the two channels of PCM are available in the DRR for processing. The C25 is interrupted every 31.25 microseconds with new channel information to receive and to transmit. There is a channel timing offset between receive and transmit functions and these interrupt functions do not occur simultaneously. The C25 synchronizes the reception of PCM by the use of an I/O pin, the BIO, on the processor.

The BIO pin is a software testable I/O pin which the C25 uses to test for the beginning of the frame. This pulse occurs every 125 microseconds with an approximate duration of 647 nanoseconds. The C25 will monitor the status of the BIO pin, in a short loop since the frame pulse is only 970 nanoseconds long, to determine when the frame begins and to reset internal software channel counter.

There is a channel count difference between the receive channels and the transmit channels, thus 2 synchronizing frame inputs connect to the processor.

As shown in FIG. 3, the DSP card is divided into three main subsections plus the power supply (not shown). They are the DSP kernels, the 68000 kernel, and the NLI kernel and interface. The 68000 performs intelligent queuing of messages and communicates with the Central Control system via the serial link 28. It controls the input to the DSP kernels.

The 68000 processor is in charge of distributing the request message from the mail boxes to the appropriate locations in the DSP kernels, monitors the kernels' report registers for completed tasks. The processor will also check for immediate change of status request on each channel issued by the Central Controller and transfers this status request to the appropriate operating channel.

FIGS. 3 and 4 pictorially illustrate the circuitry blocks for downloading program memory contents to the DSP kernels. The hold signal places the C25 in a high impedance state and activates the hold acknowledge line 54 shown on FIG. 4 which puts the C25 memory into the 68000 memory map. ROM 34 is provided as 32K×16.

Program memory 33 for the 68000 microprocessor 30 is provided as 32K×16 RAM 32 and ROM 34. It is word or byte accessible. Expansion to 64K words is possible with 2 additional 32K×8 RAM chips and replacement of DSPPALOA with DSPPALOB. DSPPALOA does not produce a chip select for the optional RAM space.

Each TMS32OC25 processor 36 has 4K words of memory which can be accessed as program or data space by the C25. A 4K×16 memory bank 38 switches into the 68000 address spectrum when the 68000 places the DSP processor in a hold state. The 68000 may then read or write to the contents of the C25 memory in word access format. It is advisable that the 68000 put the C25 into the reset mode after downloading new program material in order to place the C25 into a new known state. Attempts to write to these areas of memory without activating the hold bit for the kernel will result in a bus error. This memory is only word accessible to the 68000. Incorrect data transfers will occur if byte access operations happen in this memory space.

A 82C55 I/O port 40 is used for enabling write protection of RAM memory. Each I/O line protects 4K words of memory from unauthorized write operations. This part is initialized with 80H to address 0E00C6H after a reset occurs. After which, writing a bit '1' at 0E00C2H or at 0E00C4H will protect a given 4K block of RAM memory when the write protect function is active. When a write cycle attempts to access a protected memory location, a bus error will occur to inform the processor of the violation. The 82C55 registers as well as protected memory can be read at any time. Writing to a protected memory area while the write protect lock is active or to ROM will result in a timeout bus error.

There are provided 16 bit data registers 42, 44 for communicating between the 68000 and the DSP kernels. One set is for reading contents and the other register is for writing data. A processor will not read the same contents as are written to the register since they are distinct. Each DSP kernel has an associated set of registers 42 and 44 for transferring data. The registers are not read or written to before an examination of the appropriate bit in the interprocessor registers 48 and 49.

The C25 status port 49 coordinates the transfer of information between the 68000 and the DSP processors on the card. This register is only readable. The bits in the register 48 are set when a write to register 42 occurs, and reset when the register is read. Bits of status port 48, when active low, indicate to the 68000 that the C25 has written new data into the register 42 and that it should read the register 42. After reading the register 42, the bit indicating a message will be reset. Bits 3–5, when active low, indicate the C25 has not yet read the data register from the 68000. This provides a monitor of the C25 if after a timeout the register is not read Before time expires, however, data, if written to the register, will overwrite any data currently in storage. Bits 6–7, when active low, indicate to the 68000 which of the C25s, either A or B respectively, has requested an interrupt, processing routine.

The input-output port 40 controls a variety of devices on the card. Receipt of a POR-signal causes all output bits to be low, which is the active state for many of the devices connecting with this port. Different registers are selected on a read operation in comparison to a write operation. Both operations, though, must be with word length accesses.

When a write operation occurs the following bits are affected. Bit 0 activates a red LED on a faceplate of the card which indicates that the card is malfunctioning and needs replacement. Bit 1 activates a green LED on the faceplate of the card, which indicates that the card is properly functioning. Bit 2 activates a yellow LED on the faceplate which signals that removal of the card will affect channels in the system. Bit 3 connects to a backplane for testing purposes. Bit 4, when low, deactivates the write protect feature, which causes a Bus Error when attempting a write operation to a protected memory location. Bit 5, 6, 7, and are unused. Bits 10–12, when active, will place a DSP kernel into the Hold mode. Finally, Bits 13–15 cause a DSP kernel to be reset.

Signals from this port 40 can be read back to determine their status. Reading this address provides the hold and reset status of the C25 kernels, the write protect lock, and the LED and test bit status as seen on a previous page.

The bus error signal is used to detect attempts to access a write protected area like the program RAM, EPROM or an unused memory spaces. When this situation occurs, the bus error signal is generated and input to the BERR pin of the processor. This BERR signal is also used for completing the on-going bus cycle and to initiate the Bus Error exception routine.

The bus error signal resulting from a write to protected RAM memory can be disabled by asserting the Write_PRT_OFF~bit in the control register. This allows processor to write to the protected RAM memory without causing a bus error. A write to ROM will always result in a bus error. The memory access timer is always active and could cause a bus error when an invalid memory cycle is detected even with the Write_PRT_off~bit asserted.

Certain addresses, when written, will clear the appropriate C25 interrupt request connecting to the 68000. The 68000 must write to addresses after entering the interrupt routine or it shall continually execute an interrupt function. C25A interrupts on level 4, C25B interrupts on level 4, and C25C interrupts on level 6 of the 68000. Since both C25A and C25B interrupt on the same level, the interprocessor register 48 must be read to determine the cause of the interrupt and the 68000 must then write to the appropriate address to clear the interrupt.

The 68000 processor will reset upon the application of power or the reception of a reset command from the control link 28. The power on reset (POR~) signal will be active for at least 100 milliseconds after VCC from the power supply reaches 5 VDC. This signal drives both the RESET and HALT inputs of the 68000 processor to assure a proper starting mode.

In normal operation, the serial link 22 from the DSP card is periodically polled by the NSC card to determine activity on the link. Lack of response will cause the NSC card to generate a soft reset on the DSP through a Non-Maskable Interrupt (interrupt level 7). Further inactivity at this time then causes the NSC to generate a hard reset through the POR~circuitry to reset the entire card 10.

The Non-Maskable Interrupt from the NLI IC also serves as a watchdog timer on the DSP card. The DSP card must respond to this interrupt to avoid a hard reset from the NSC. Whenever the reset line is active, all of the front faceplate lamps illuminate and must be extinguished by 68000 software. The DSP kernels automatically enter a hold and reset state upon the reception of the POR~signal. Inspection of C25 program memory can occur at this time.

Interrupt generation on the DSP card results from the timer interrupt, NLI communications interrupt, the NLI soft reset (watchdog timer) interrupt, and C25 interrupt requests. Autovector interrupts are used on the DSP card for physical area savings and accommodate all necessary interrupts. The assignment of interrupt levels are:

Level 7—NMI—Soft reset from the Network link.
Level 6—C25C INT—Interrupt request from C25C.
Level 5—NLI INT—Information available from over the network link.
Level 4—C25 INT—Interrupt request from C25B and/or C25A.
Level 3—Test Int—An interrupt for test engineering purposes.
Level 2—10MSEC~—10 millisecond interrupt from the NLI IC.
Level 1—Time interrupt. This interrupt indicates the presence of A signalling bits this occurs every 1.5 milliseconds.

All interrupt sources connect to a priority encoder whose outputs attach to the Interrupt Priority Level pins on the 68000. The Function Control output lines of the 68000 are then decoded to as an interrupt acknowledge signal. This interrupt acknowledge IACK signal is then input to the valid preferred address VPA lead to initiate the exception handling process.

Each external memory or I/O access of the 68000 processor requires an asynchronous data transfer acknowledgement DTACK signal to complete a cycle. The processor supports different device speeds: 500 nanoseconds for EPROMS and the 8255/400 nanoseconds for RAMs, and approximately 400 nanoseconds for I/O devices.

The address strobe and address decode signals are gated together to generate a DTACK signal. At the beginning of a processor cycle, a counter loads with the equivalence of 6.4 microseconds, and if a DTACK signal does not become available during this time, a Bus Error occurs, indicating a faulty cycle.

The microprocessor 36 is a TMS320C25 and is a general purpose high speed microprocessor. It operates at 40 MHz and has a 100 nanosecond instruction cycle timing. The 40 MHZ clock is divided internally to 10 MHz in the C25, which clocks the 68000.

The C25 physically separates data, program, and I/O space into three different banks of addresses. The data and program memory spaces, as implemented in hardware, are combined. The 4K×16 program memory space begins at location >0000. A block of memory internal to the C25 may either be program or data space and is assignable by executing a software command.

The C25 uses 3 I/O addresses for communication with the 68000. Port 0 is the data register address which allows 16 bits to be read from and written to the 68000. Port 1 is a read only address which provides status information about messages between the 68000 and the C25.

When the C25 writes data with OUT 0 to the data register for the 68K, a bit is reset with a flip flop to signal to the 68K that data is available. When the 68K reads this location, the flip flop will set indicating that more data can be sent. This bit can be read by the C25 and is INP 1, bit 1.

Likewise, when the 68K writes a word to the C25, bit 0 of input port 1 is reset. The C25 periodically polls this port to determine if information is available by testing for bit 0 being 0.

The C25 has the capability of transmitting PCM data to the NLI 27. The drive line of the C25, the DX pin, is a high impedance driver that is sequentially selected by the circuitry connecting with the NLI.

Serial PCM data is clocked into the C25 by the NLI sequencing circuitry which produces a frame sync pulse for receive (FSR). This pulse and the proper setting of the C25 firmware clock in 2 channels of PCM into the C25. Once the receiving register is loaded, an interrupt is generated and the data is processed by the C25.

The C25 processor can interrupt the 68000 processor by toggling the XF output pin with the RXF and SXF instructions. The rising edge of the XF line triggers an interrupt to the 68000.

The following C25 software illustrates how to accomplish this operation.

| *Cause a 68000 interrupt. | |
|---|---|
| RXF | ; XF=0 |
| SXF | ; XF=1 ~ Creates a rising edge |
| DONE | |

The DSP card can support 24 channels of voice and tone interfacing through a single NLI IC 24. The NLI maps into the 68000 memory as an I/O peripheral with 32 registers. The NLI communicates with the 68000 via interrupt level 5. The internal FIFO of the NLI is read by the 68000 to transfer data from the network link to the card. Upon receiving an interrupt from the NLI, the 68000 reads the data from the 16 level FIFO. This clears the interrupt request to the 68000. Upon emptying the incoming data from the FIFO, the processor then writes data out to the FIFO for transmission over the network link.

The DSP kernels connect to both the receive and transmit serial bit streams of the NLI. Clock information selects each DSP kernel in sequence such that each kernel receives 2 channels of information for every 6 channels. Thus, this feature is not programmable by the 68000 processor. The following table shows the channels assigned to each C25 in a frame.

| | Channels Used |
|---|---|
| C25A | 0, 1, 6, 7, 12, 13, 18, 19 |
| C25B | 2, 3, 8, 9, 14, 15, 20, 21 |
| C25C | 4, 5, 10, 11, 16, 17, 22, 23 |

The receive framing line (the 8 KHz signal) from the NLI informs the DSP kernels when a new frame is beginning. Other lines from the NLI connect into the DSP kernel to indicate transmit frame, transmit superframe, and receive superframe, and are assigned interrupt levels 0–2 on the DSP processor. These interrupt levels may be utilized.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A digital signal processing system for interfacing with a central control having at least one port, comprising:

means for processing having an interface port connected to the port of the central control and at least first, second and third ports;

a serial multiplex communication bus for carrying at least n×6, where n is a whole number, channels on a synchronous time division basis;

at least first, second and third kernels for running software application tasks having at least first, second and third ports, respectively, connected to said at least first second and third ports of said processing means, respectively, each of said kernels having a channel port connected to the serial multiplex communication bus;

means for selecting, in sequence, each of said kernels for intermittent communication with said serial multiplex communication bus to cause each of said kernels to continuously communicate with two successive channels for every six channels occurring on said serial multiplex communication bus; and said processing means receives data from the central control and in response to the data selectively (a) transfers the data to the kernels and (b) processes the data without transferring the data to the kernels.

2. The digital signal processing system of claim 1 wherein the serial multiplex communication bus carries at least 24 channels, and each kernel communicates with 8 channels of said 24 channels, each kernel receiving channels different than channels received by other kernels.

3. The digital signal processing system of claim 2 wherein said 24 channels are pulse code modulated and are designated 0 through 23, said first kernel communicates with channels 0, 1, 6, 7, 12, 13, 18 and 19, said second kernel communicates with channels 2, 3, 8, 9, 14, 15, 20 and 21, and said third kernel communicates with channels 22, 23, 4, 5, 10, 11, 16 and 17.

4. The digital signal processing system of claim 3 wherein each kernel has its respective channel port connected to said bus by means for multiplexing and demultiplexing.

5. The digital signal processing system of claim 1 wherein each kernel has separate means for processing for performing said software application tasks.

6. The digital signal processing system of claim 5 wherein the serial multiplex communication bus carries channels at a preselected speed and each of the separate processing means selectively performs software application tasks on channels carried at a maximum speed of one-third the speed of the channels carried on the serial multiplex communication bus.

7. The digital signal processing system of claim 5 wherein said software application tasks are performed on data received from selected channels on the serial multiplex bus to produce results and each kernel transfers the results to the processing means.

8. The digital signal processing system of claim 1 wherein said software application tasks include at least one of DTMF detection, MF detection and metering.

9. The digital signal processing system of claim 8 wherein each kernel is separately assigned any one of said application tasks by said processing means.

10. A digital signal processing system for interfacing with a central control having at least one port, comprising:

means for processing having an interface port connected to the port of the central control and at least first, second and third ports;

a serial multiplex communication bus for carrying a preselected plural number of channels on a synchronous time-division basis;

at least first, second and third kernels for running software application tasks having at least first, second and third ports, respectively, connected to said at least first second and third ports of said processing means, respectively, each of said kernels having a channel port connected to the serial multiplex communication bus;

means for selecting, in sequence, each of said kernels for continuous communication with channels on said serial multiplex communication bus;

said processing means responsive to data received from the central control to establish one of a plurality of software application tasks in each of said kernels, said software application tasks being downloaded from said central control to each of said kernels via said processing means; and each kernel communicating with a preselected number of the channels of the serial multiplex communication bus, each kernel communicating with channels different than the plurality of channels with which the other kernels communicate.

11. The digital signal processing system of claim 18 wherein the number of channels on the serial multiplex communication bus with which each kernel communicates is the number of channels on the serial multiplex communications bus divided by the number of kernels.

12. In a telecommunication system with a synchronous time division serial multiplex communication bus having $n \times 6$, where n is a whole number, channels and an automatic call distributor having a central control, the improvement being a pulse code modulation data analyzer, comprising:

programmable means for processing electrically coupled to the central control and responsive to data from the central control;

at least three kernel programmable means for processing electrically coupled to the programmable processing means, each of the kernel programmable processing means selectively, individually responsive to data from the programmable processing means;

means for sequentially selecting each of the kernel programmable processing means for intermittent communication with the bus to continuously receive two successive channels for every six channels occurring on the bus; and means at each of the at least three kernel programmable processing means for analyzing signal characteristics of the at least two successive channels received by the respective kernel programmable processing means.

* * * * *